United States Patent
Chen et al.

(10) Patent No.: US 9,176,273 B2
(45) Date of Patent: Nov. 3, 2015

(54) BACKLIGHT UNIT FOR USE IN MULTIPLE-DISPLAY DEVICE

(71) Applicant: AU OPTRONICS CORP., Hsin-Chu (TW)

(72) Inventors: Nan-Jui Chen, Hsin-Chu (TW);
Chao-Heng Tu, Hsin-Chu (TW);
Shih-Ting Chen, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 246 days.

(21) Appl. No.: 13/939,356

(22) Filed: Jul. 11, 2013

(65) Prior Publication Data
US 2014/0307473 A1    Oct. 16, 2014

(30) Foreign Application Priority Data
Apr. 12, 2013    (TW) .............................. 102113153 A

(51) Int. Cl.
*F21V 7/04* (2006.01)
*F21V 8/00* (2006.01)
*G06F 3/14* (2006.01)

(52) U.S. Cl.
CPC ............ *G02B 6/0068* (2013.01); *G06F 3/1446* (2013.01); *G02B 6/0078* (2013.01)

(58) Field of Classification Search
CPC .. G06F 3/1446; G02B 6/0066; G02B 6/0068; G02B 6/0073; G02B 6/0076; G02B 6/0078; F21V 8/00
USPC .................. 362/612, 613, 616, 632, 633, 634
See application file for complete search history.

(56) References Cited

U.S. PATENT DOCUMENTS

| | | | |
|---|---|---|---|
| 6,615,526 B2 | 9/2003 | Pitcher et al. | |
| 8,556,492 B2 * | 10/2013 | Joung et al. | 362/616 |
| 2008/0158468 A1 | 7/2008 | Kim et al. | |
| 2011/0019124 A1 | 1/2011 | Kim et al. | |
| 2011/0194047 A1 | 8/2011 | Bruyneel et al. | |
| 2011/0280045 A1 * | 11/2011 | Baek et al. | 362/612 |
| 2012/0002135 A1 | 1/2012 | Hiraguri | |
| 2012/0159825 A1 * | 6/2012 | Pitcher et al. | 40/735 |
| 2012/0201050 A1 * | 8/2012 | Kang et al. | 362/611 |
| 2013/0044509 A1 * | 2/2013 | Chung et al. | 362/602 |

FOREIGN PATENT DOCUMENTS

| | | |
|---|---|---|
| CN | 101211048 | 7/2008 |
| CN | 102177710 | 9/2011 |
| TW | I370285 | 12/2006 |
| TW | 200727053 | 7/2007 |
| TW | 201017268 | 5/2010 |

OTHER PUBLICATIONS

China Patent Office, "Office Action," Apr. 29, 2015.
Taiwan Patent Office, "Office Action," May 13, 2015.

* cited by examiner

Primary Examiner — Y M Lee
(74) Attorney, Agent, or Firm — WPAT, PC; Justin King

(57) ABSTRACT

A display device includes at least two display panels and a frame for supporting the display panels. The frame includes a partition wall configured for supporting at least an end portion of the display panels. A backlight unit is located at one side of the display panels and provides light to the display panels. The backlight unit includes a strip light source, a longitudinal edge of which is extended along a longitudinal edge of the partition wall for emitting light to the display panels disposed at opposite side of the partition wall and two light-guiding plates disposed at opposite sides of the strip light source for guiding the light emitted from the strip light source into the display panels.

18 Claims, 13 Drawing Sheets

BACKLIGHT UNIT FOR USE IN MULTIPLE-DISPLAY DEVICE

FIELD OF THE INVENTION

The present invention relates to a backlight unit, and more particularly to a backlight unit for use in a multiple-display device.

BACKGROUND OF THE INVENTION

In recent years, slim and light liquid crystal display devices (LCDs) with improved performance have been used in different kinds of electronic devices, such as mobile phones, notebook computers and flat-panel TV sets. Their applications now extend to larger public display devices, such as scoreboards at stadiums or large billboards at stores. As a result, the LCDs must be large enough in size that a number of people can view the displayed image clearly from distant places. However, for the fabrication of a large display device, larger processing equipments are required, and furthermore, failure of a large glass substrate will cost more.

Currently, a multiple-display device has been developed to fulfill the demands of large size and low manufacturing cost. A multiple-display device may be produced by combining a plurality of small-sized displays. FIG. 1 is a perspective view of a multiple-display device in related art, and FIG. 2 is a cross-sectional view taken along line B-B' of FIG. 1.

As shown in FIG. 1, a multiple-display device 50 in related art is manufactured by four liquid crystal display modules 10, 20, 30 and 40 arranged as an array. As shown in FIG. 2, the liquid crystal display modules 10 and 20 include liquid crystal panels 11 and 21 for displaying images, backlight units 12 and 22 comprising light sources 16 and 26 for supplying uniform light to the liquid crystal panels 11 and 21, bottom bezels 13 and 23 for supporting the backlight units 12 and 22, and frames 14 and 24, together with top cases 15 and 25, for supporting and retaining the liquid crystal panels 11 and 21 therein, respectively. The backlight units 12 and 22 respectively include light-guiding plates 17 and 27 and optical-film stacks 18 and 28. The light-guiding plates 17 and 27 are disposed at the light emitting side of the light sources 16 and 26 and guiding the light emitted from the light sources 16 and 26 through the optical-film stacks 18 and 28 into the liquid crystal panels 11 and 21, respectively, for providing uniform light to the liquid crystal panels 11 and 21.

The multiple-display device 50 has an active area (AA) where an image is displayed and a non-active area (NA) where no image is displayed in each display module. The non-active area NA surrounds the active area AA. As shown in FIG. 1, the dimensions of the combined non-active area NA interposed between adjacent two LCD modules are defined as "L" in Y-axis and "M" in X-axis. As shown in FIG. 2, since the backlight units 12 and 22 belong to edge-type backlight units, the dimension L is made larger than the dimension M. Unfortunately, wide non-active area NA is an obstacle to the enhancement of the image quality of the display. The non-active area might adversely affect the continuity of an image shown on a multiple-display device.

SUMMARY OF THE INVENTION

The present invention provides a display device which comprises at least two display panels and a frame for supporting the display panels. The frame comprises a partition wall configured for supporting at least an end portion of the display panels. A backlight unit located at one side of the display panels and providing light to the display panels. The backlight unit comprises a strip light source, a longitudinal edge of which is extended along a longitudinal edge of the partition wall for emitting light to the display panels disposed at opposite side of the partition wall and two light-guiding plates disposed at opposite sides of the strip light source for guiding the light emitted from the strip light source into the display panels.

According to an embodiment, the aforementioned strip light source comprises a strip-shaped board, on a top surface of which a first group of light-emitting elements and a second group of light-emitting elements are disposed, and the first group of light-emitting elements and the second group of light-emitting elements emit light toward the display panels disposed at the opposite sides of the partition wall, respectively. According to the embodiment, the first group of light-emitting elements and the second group of light-emitting elements are alternately disposed on the strip-shaped board while the first group of the light-emitting elements overlaps with the second group of light-emitting elements along a longitudinal edge of the strip-shaped board. Basically, these light-emitting elements are arranged substantially in a line with their light emitting surface alternately emit light to the opposite sides of the partition wall.

According to another embodiment, the strip light source comprises two strip-shaped boards disposed in parallel, on respective lateral surfaces of which a plurality of light-emitting elements are disposed with a light emitting surface of each of the light-emitting elements parallel to a corresponding one of the respective lateral surfaces of the strip-shaped boards and emit light to the opposite sides of the partition wall.

By using a strip light source which can emit light to opposite sides to replace the light sources within two backlight units used in related art, less material for the frames, bezels and/or cases would be required. In addition, by combining the light-guiding plates on opposite sides of the strip light source, the demand on a narrow border of the multiple-display device could be achieved.

According to yet another embodiment, the first group of light-emitting elements and the second group of light-emitting elements are alternately disposed on the strip-shaped board and emit light toward opposite sides, in which a gap is extended along a longitudinal edge of the strip-shaped board and disposed between the first group of light-emitting elements and the second group of light-emitting elements. A supporting part extending downwardly from the partition wall and passing through the gap to reach the strip-shaped board.

Using a partition wall with a supporting part extending downwardly from the partition wall and passing through the gap between the first and the second groups of light-emitting elements to reach the strip-shaped board can improve the ability of the frame for supporting the display panels and strengthen whole structure.

According to yet another embodiment, the strip light source comprises two strip-shaped boards disposed in parallel, on respective lateral surfaces of which a plurality of light-emitting elements are disposed with a light emitting surface of each of the light-emitting elements parallel to the lateral surface of a corresponding one of the strip-shaped boards. A gap is formed between the strip-shaped boards, with which a supporting part of the frame extending downwardly from the partition wall and passing through the gap to reach the bottom bezel. Thereby, whole structure of the display device could be strengthened and the ability of the frame for supporting the liquid crystal panels could be improved.

According to yet another embodiment, the partition wall, the strip-shaped board or the bottom bezel are formed of flexible material. The flexibility of these parts makes the two adjacent display panels bent slightly to achieve the demand of curved display.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
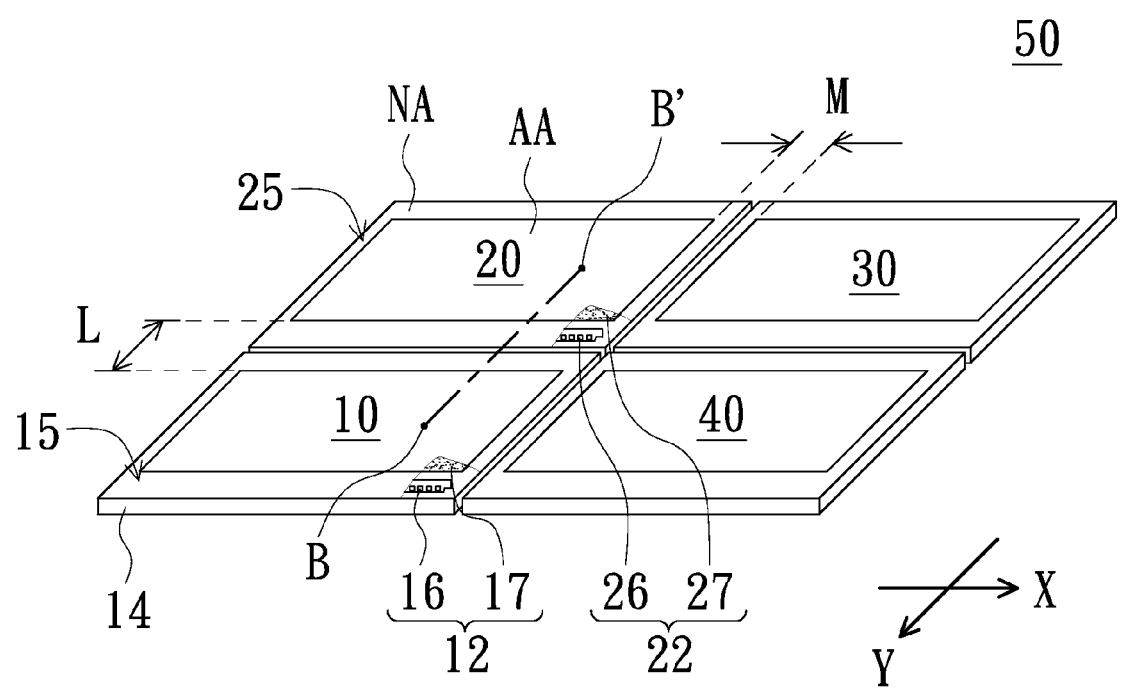
FIG. 1 is a schematic perspective view of a multiple-display device in related art.
Figure 2:
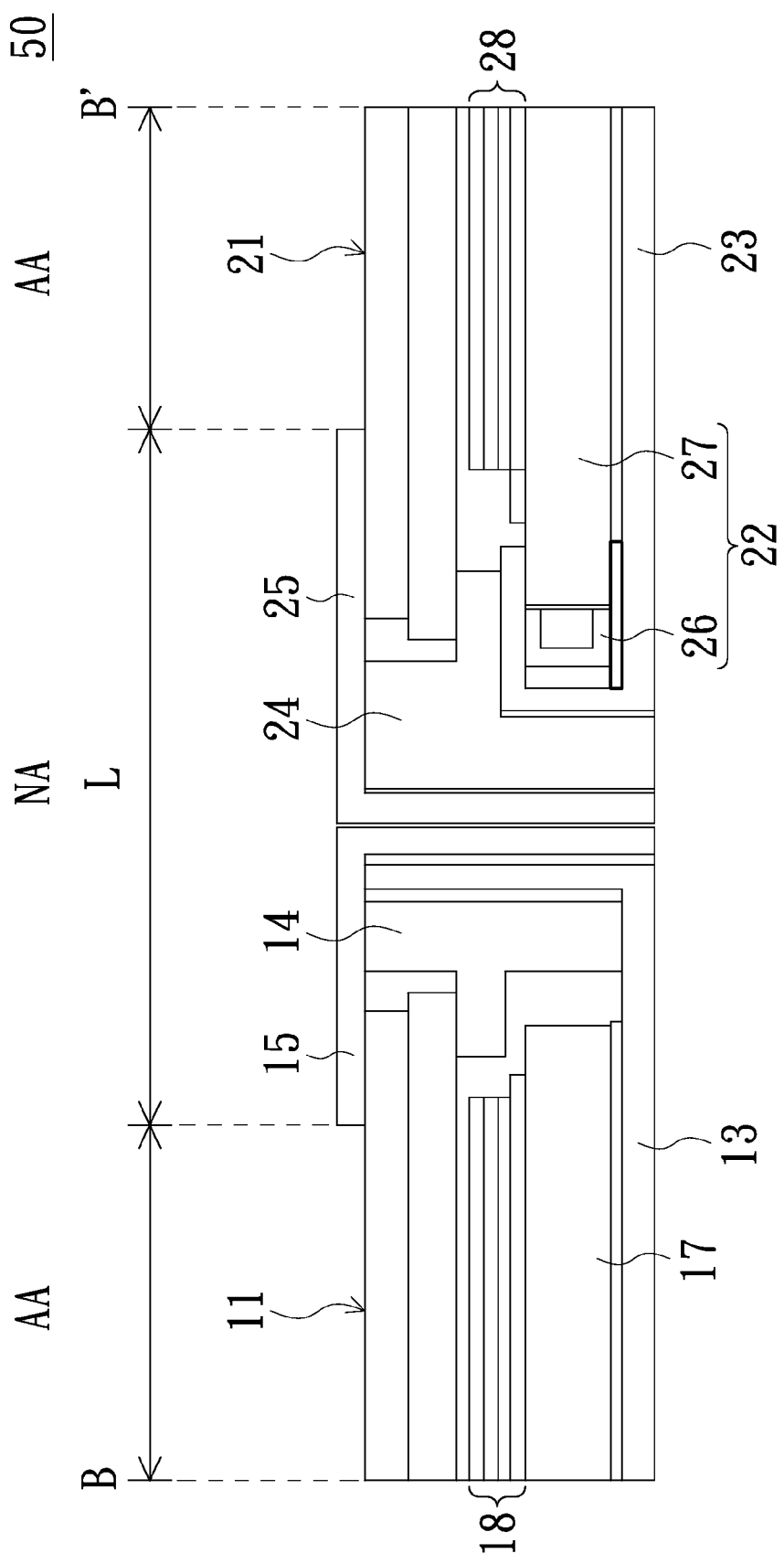
FIG. 2 is a schematic cross-sectional view taken along line B-B' of FIG. 1.
Figure 3:
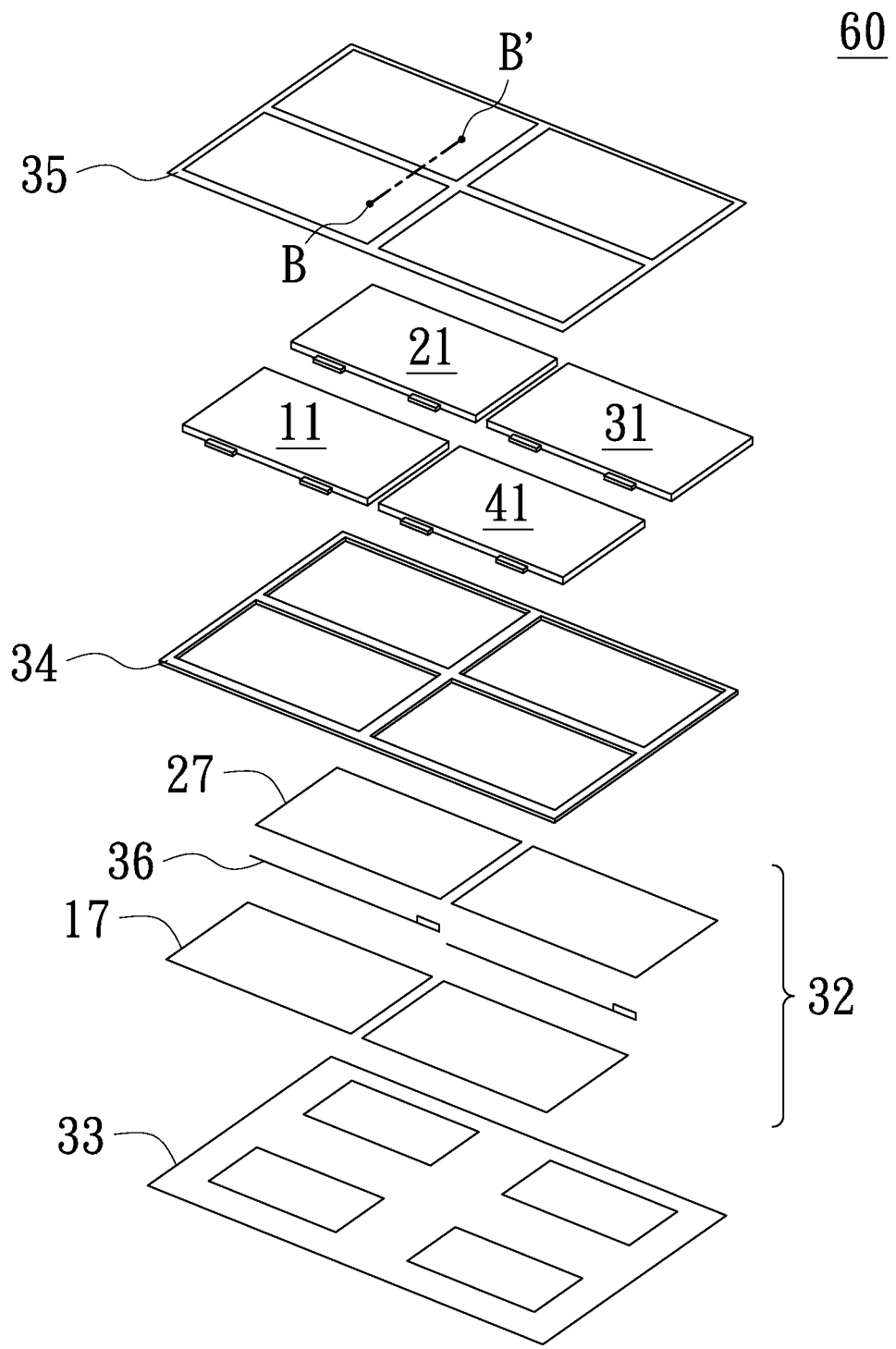
FIG. 3 is a schematic exploded perspective view of a multiple-display device according to a first embodiment.
Figure 4:
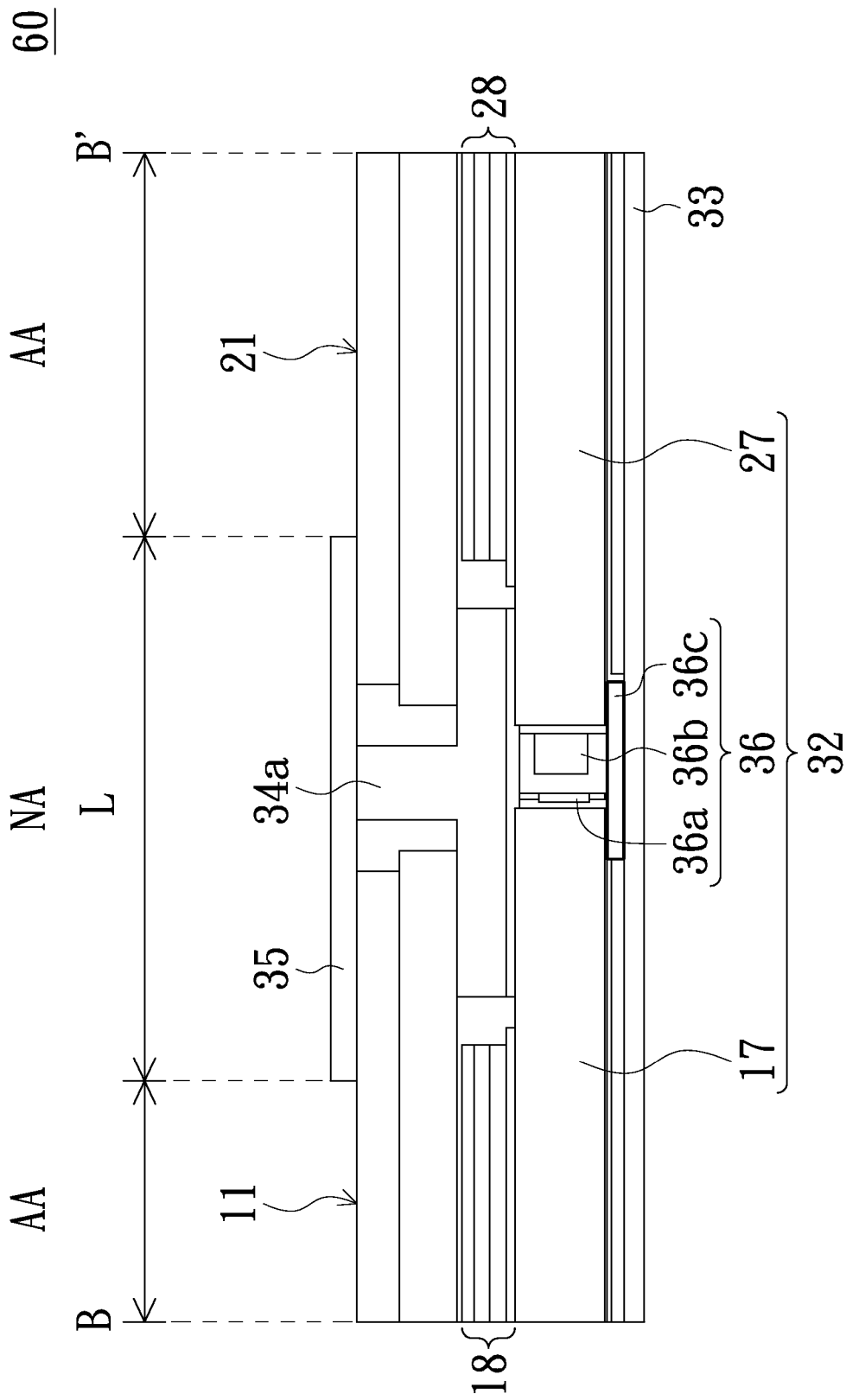
FIG. 4 is a schematic cross-sectional view taken along line B-B' of the assembly of FIG. 3.

As shown in FIG. 3 and FIG. 4, a multiple-display device 60 comprises liquid crystal panels 11, 21, 31 and 41 for displaying an image, a frame 34 and a top case 35 for supporting and fixing the liquid crystal panels 11, 21, 31 and 41, and a backlight unit 32 including strip light sources 36, light-guiding plates 17 and 27 and optical-film stacks 18 and 28 for transmitting uniform light to the liquid crystal panels 11 and 21. The backlight unit 32 and the frame 34 are further accommodated in a bottom bezel 33.

The frame 34 comprises a partition wall 34a configured for supporting end portions of adjacent display panels, for example panels 11 and 21. The backlight unit 32 is disposed at one side of the display panels 11 and 21, e.g. the lower side as shown in FIG. 4, and provides uniform light to the display panels 11 and 21. A longitudinal edge of the strip light source 36, which is defined to be in a direction normal to the plane depicted in FIG. 4, extends along a longitudinal edge of the partition wall 34a, which is also defined to be in a direction normal to the plane of FIG. 4, and emits light to the display panels 11 and 21 disposed at opposite sides of the partition wall 34a, e.g. left and right sides as shown in FIG. 4. Two light-guiding plates 17 and 27 are disposed at opposite sides of the strip light source 36, respectively, and guide the light emitted from the strip light source 36 through optical-film stacks 18 and 28 into the display panels 11 and 21.

Figure 5:
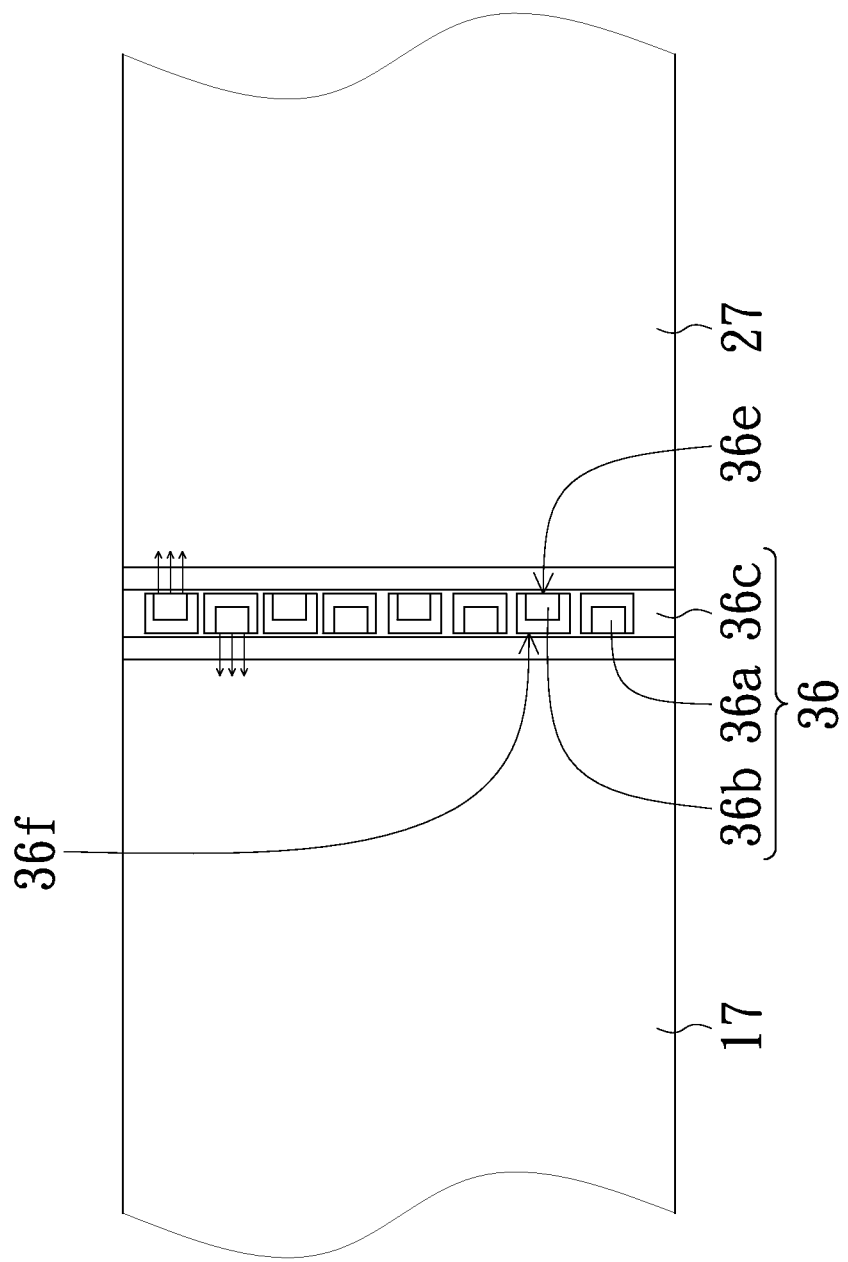
FIG. 5 is a schematic top plan view partially illustrating a backlight unit adapted to be used in the first embodiment of the display device.

FIG. 5 is a schematic top plan view partially illustrating a backlight unit adapted to be used in the first embodiment of the display device. The strip light source 36 comprises a strip-shaped board 36c, on a top surface of which a first group of light-emitting elements 36a and a second group of light-emitting elements 36b are disposed, and the first group of light-emitting elements 36a and the second group of light-emitting elements 36b emit light toward the display panels 11 and 21 disposed at the opposite sides of the partition wall 34a shown in FIG. 4, respectively. A material of the strip-shaped board 36c could be epoxide woven glass fabric copper-clad laminates (Glass Fiber CCL) such as FR4, CEM-1 or CEM-3, phenolic cellulose paper copper-clad laminates (Paper Phenolic CCL) such as FR1, and other materials such as polyester (PET), polyimide (PI), bakelite, plastics or aluminum substrates, etc.

As shown in FIG. 5, the first group of light-emitting elements 36a and the second group of light-emitting elements 36b are Side-view LEDs. That is, a light emitting surface 36e of each of the light-emitting elements in both the first group and the second group is perpendicular to a top surface of the strip-shaped board 36c. The first group of light-emitting elements 36a and the second group of light-emitting elements 36b are alternately disposed on the strip-shaped board 36c. The first group of the light-emitting elements 36a overlaps with the second group of light-emitting elements 36b while viewing along a longitudinal edge of the strip-shaped board 36c in order to minimize the width of the strip-shaped board 36c. In this embodiment, the first group of the light-emitting elements 36a well aligns with the second group of light-emitting elements 36b along the longitudinal edge of the strip-shaped board 36c.

Figure 6:
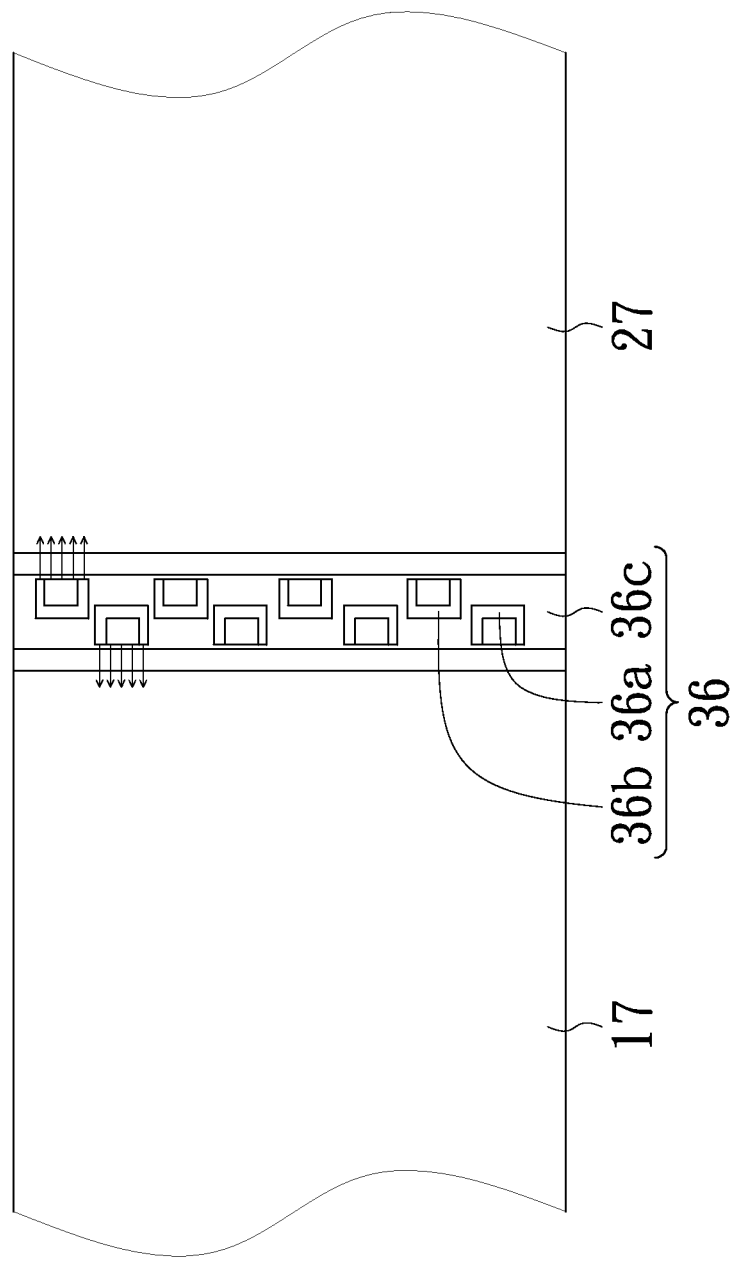
FIG. 6 is a schematic top plan view partially illustrating a backlight unit according to a second embodiment.

Alternatively, in a second embodiment of the backlight unit, the first group of light-emitting elements 36a may partially overlaps with the second group of light-emitting elements 36b along the longitudinal edge of the strip-shaped board 36c, as illustrated in FIG. 6.

Basically, in the above embodiments, these light-emitting elements 36a and 36b are arranged substantially in a line with their light emitting surfaces 36e alternately faced to different sides so as to emit light to the opposite sides of the partition wall 34a.

Since two liquid crystal panels 11 and 21 share a top case 35 and a partition wall 34a, the materials used in frameworks, bezels or cases between two liquid crystal panels in related art could be reduced. Furthermore, with the arrangement of the lateral light-guiding plates 17 and 27 on opposite sides of the strip light source 36, the demand of a narrow border multiple-display device could be achieved.

Figure 7:
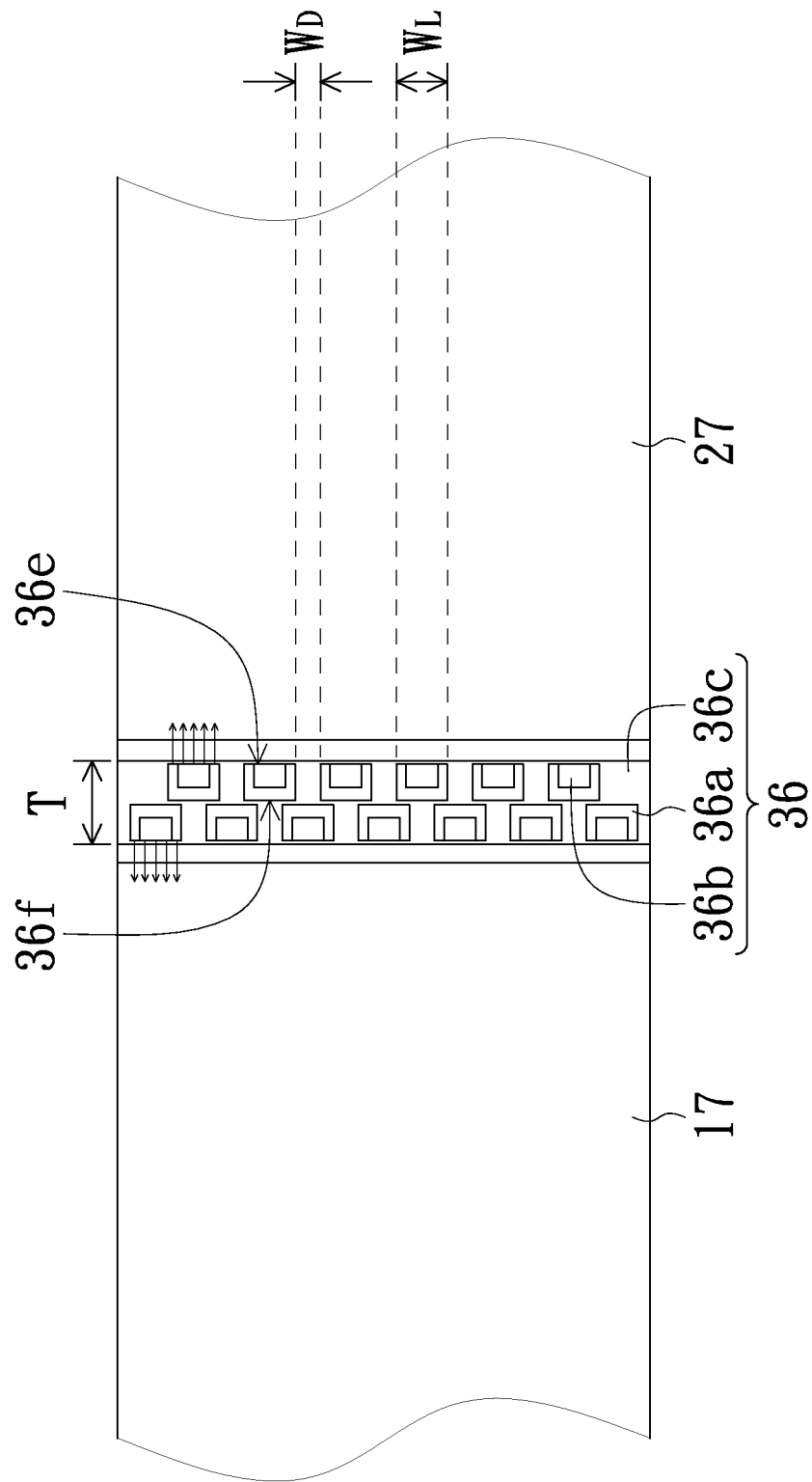
FIG. 7 is a schematic top plan view partially illustrating a backlight unit according to a third embodiment.

FIG. 7 is a schematic top plan view partially illustrating a backlight unit according to a third embodiment. Responding to requirement on high brightness of the backlight unit, the first group of light-emitting elements 36a and the second group of light-emitting elements 36b are staggered when viewing along the longitudinal edge of the strip-shaped board 36c so that more light-emitting elements can be mounted. In another view along a transverse edge T of the strip-shaped board 36c, the first group of light-emitting elements 36a partially overlaps with the second group of light-emitting elements 36b.

In this embodiment, a clearance $W_D$ between adjacent light-emitting elements in the same group is less than the length $W_L$ of each light-emitting element itself.

Figure 8:
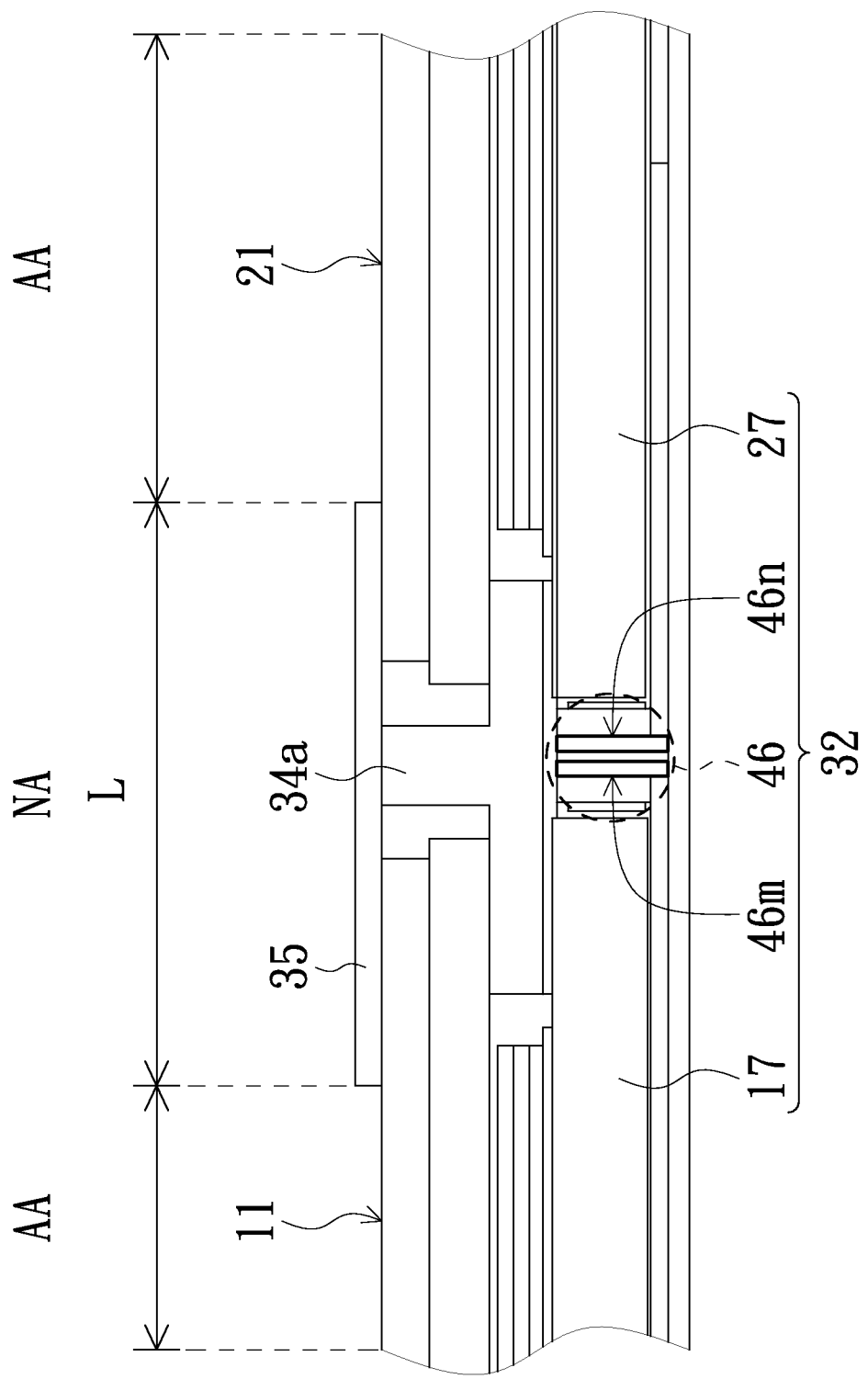
FIG. 8 is a schematic cross-sectional view of a multiple-display device according to a fourth embodiment.
Figure 9:
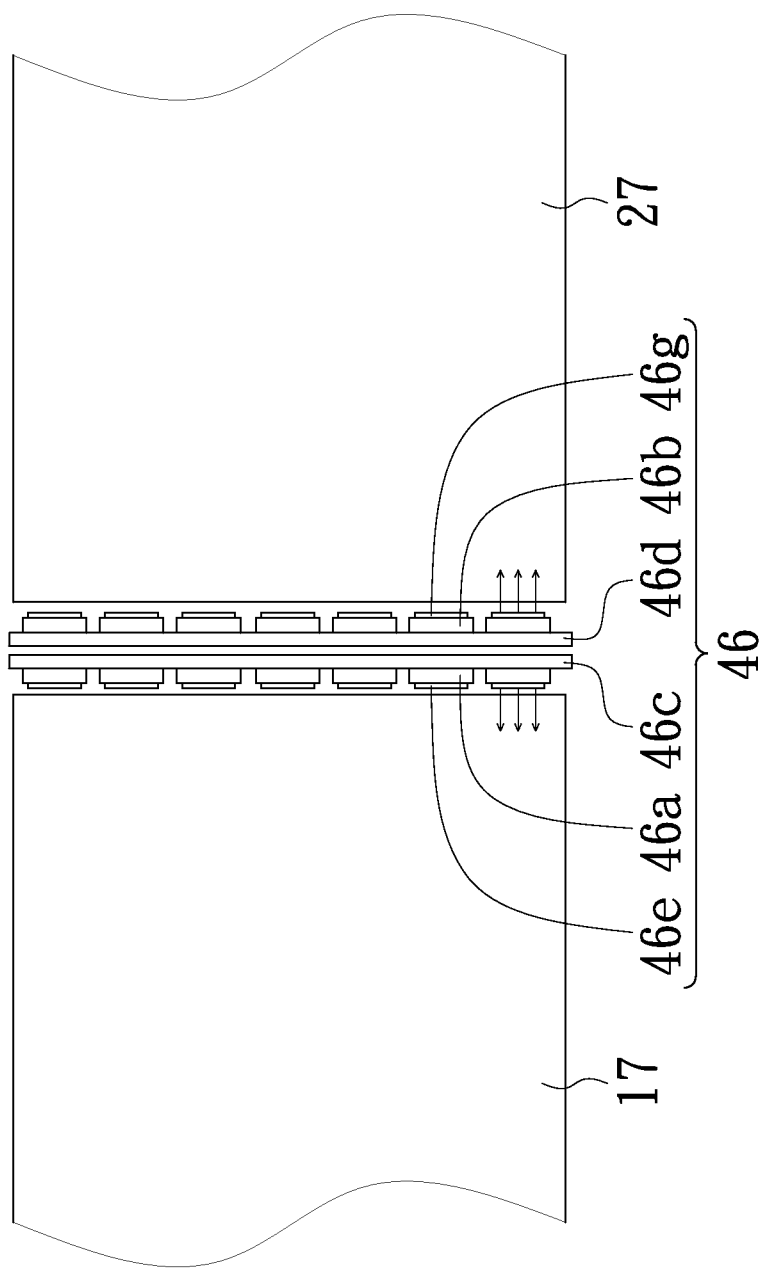
FIG. 9 is a schematic top plan view partially illustrating a backlight unit according to the fourth embodiment.

FIG. 8 and FIG. 9 are a schematic cross-sectional view of a multiple-display device and a schematic top plan view partially illustrating a backlight unit according to a fourth embodiment, respectively. The multiple-display construction of this embodiment is similar to that of the first embodiment except the features to be described hereinafter.

As shown in FIG. 8 and FIG. 9, the strip light source 46 comprises two strip-shaped boards 46c and 46d disposed in parallel. A plurality of light-emitting elements 46a and 46b are disposed on respective lateral surfaces 46m and 46n with light emitting surfaces 46e and 46g parallel to the lateral surfaces 46m and 46n of the strip-shaped boards 46c and 46d.

In this embodiment, light-emitting elements 46a and 46b are Top-view LEDs. The LEDs are disposed on the strip-shaped boards 46c and 46d, respectively, with proper clearance therebetween, and emit light to the opposite sides of the partition wall 34a. With this configuration, the materials used in frameworks, bezels or cases between two liquid crystal panels in related art could be reduced. Furthermore, with the arrangement of the lateral light-guiding plates 17 and 27 on opposite sides of the strip light source 46, the demand of a narrow border multiple-display device could be also achieved.

Figure 10:
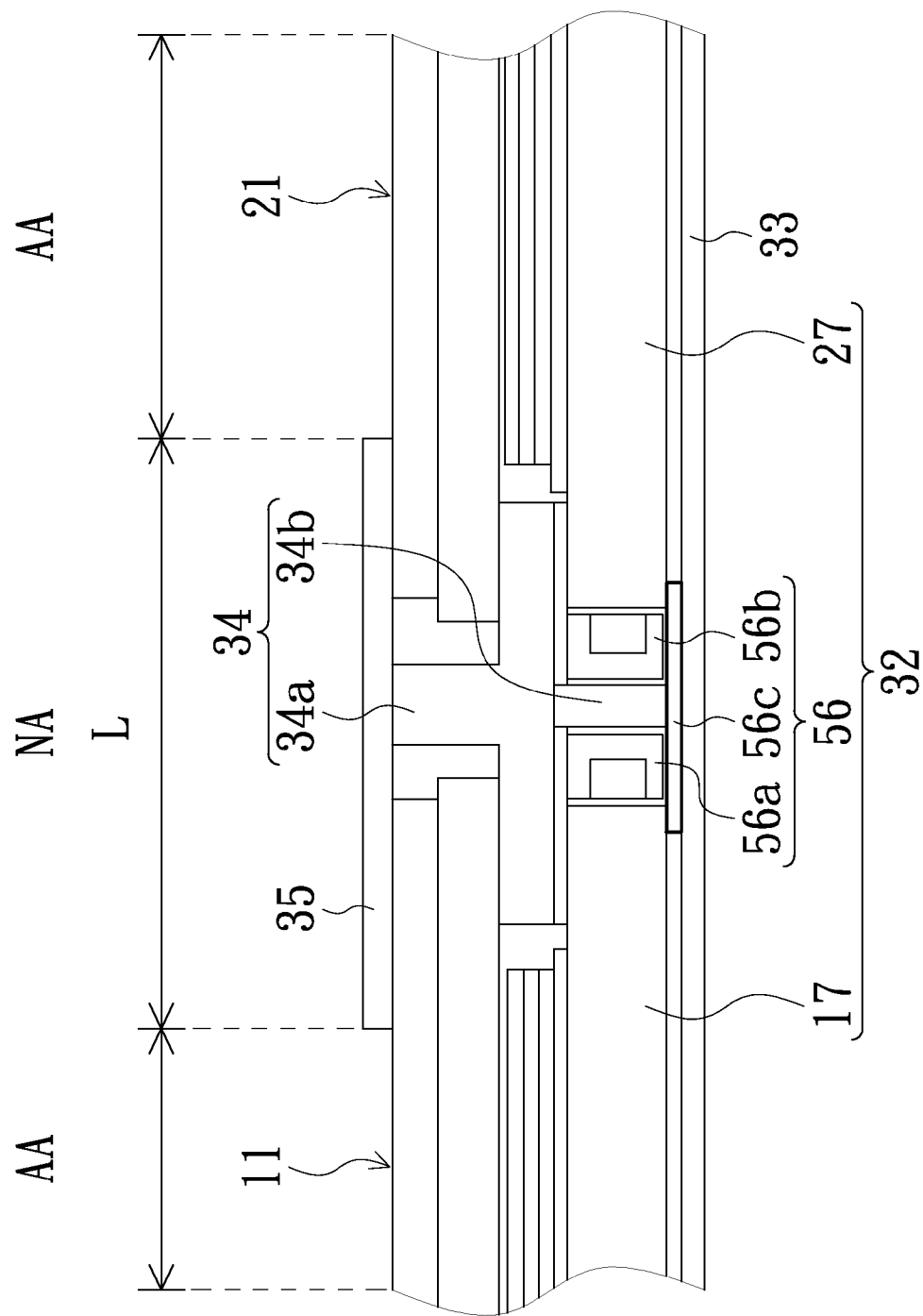
FIG. 10 is a schematic cross-sectional view of a multiple-display device according to a fifth embodiment.
Figure 11:
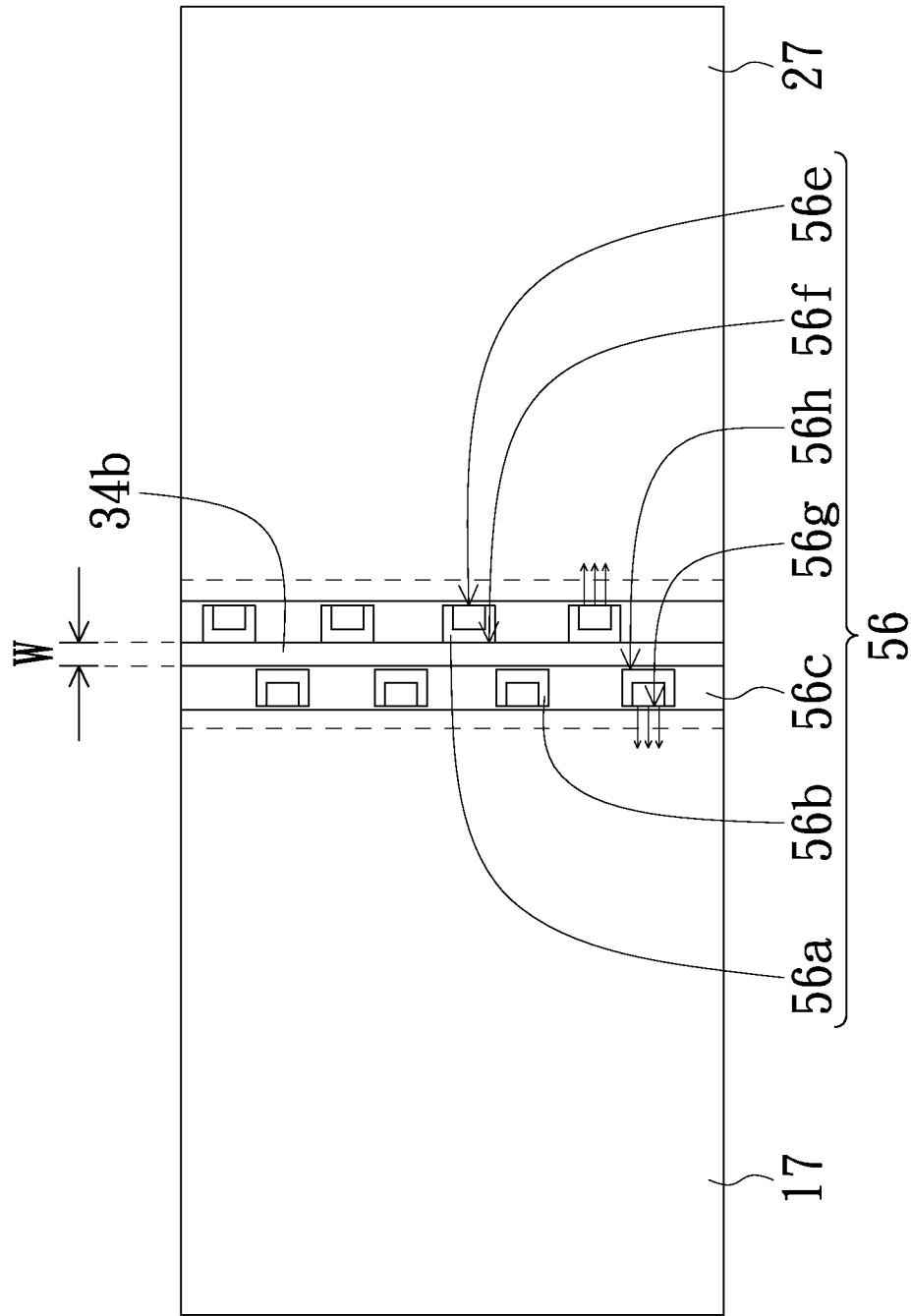
FIG. 11 is a schematic top plan view partially illustrating a backlight unit according to the fifth embodiment.

FIG. 10 and FIG. 11 are a schematic cross-sectional view of a multiple-display device and a schematic top plan view partially illustrating a backlight unit according to a fifth embodiment, respectively. As shown in FIG. 10 and FIG. 11, a multiple-display device 80 comprises liquid crystal panels 11 and 21 for displaying an image, and a frame 34 supporting the liquid crystal panels 11 and 21. The frame 34 further comprises a partition wall 34a configured for supporting end portions of the display panels 11 and 21, and a supporting part 34b extending downwardly from the partition wall 34a.

A backlight unit 32 is located at one side of the display panels 11 and 21 for supplying uniform light to the liquid crystal panels 11 and 21 and comprises a strip light source 56. At a bottom side of the multiple-display device 80, a bottom bezel 33 is disposed for receiving and supporting the backlight unit 32 and the frame 34.

In this embodiment, the strip light source 56 comprises a strip-shaped board 56c. A first group of light-emitting elements 56a and a second group of light-emitting elements 56b are alternately disposed on a top surface of the strip-shaped board 56c, and the first group of light-emitting elements 56a and the second group of light-emitting elements 56b emit light toward the liquid crystal panels 11 and 21 disposed at the opposite sides of the partition wall 34a, respectively. A gap W exists between a back side 56f of the first group of light-emitting elements 56a and a back side 56h of the second group of light-emitting elements 56b, extending along a longitudinal edge of the strip-shaped board 56c. The supporting part 34b extends downwardly from the partition wall 34a and passes through the gap W to reach the strip-shaped board 56c, with which the structure of the display device 80 can be strengthened and the ability of the frame 34 to support the liquid crystal panels 11 and 21 can be improved.

Figure 12:
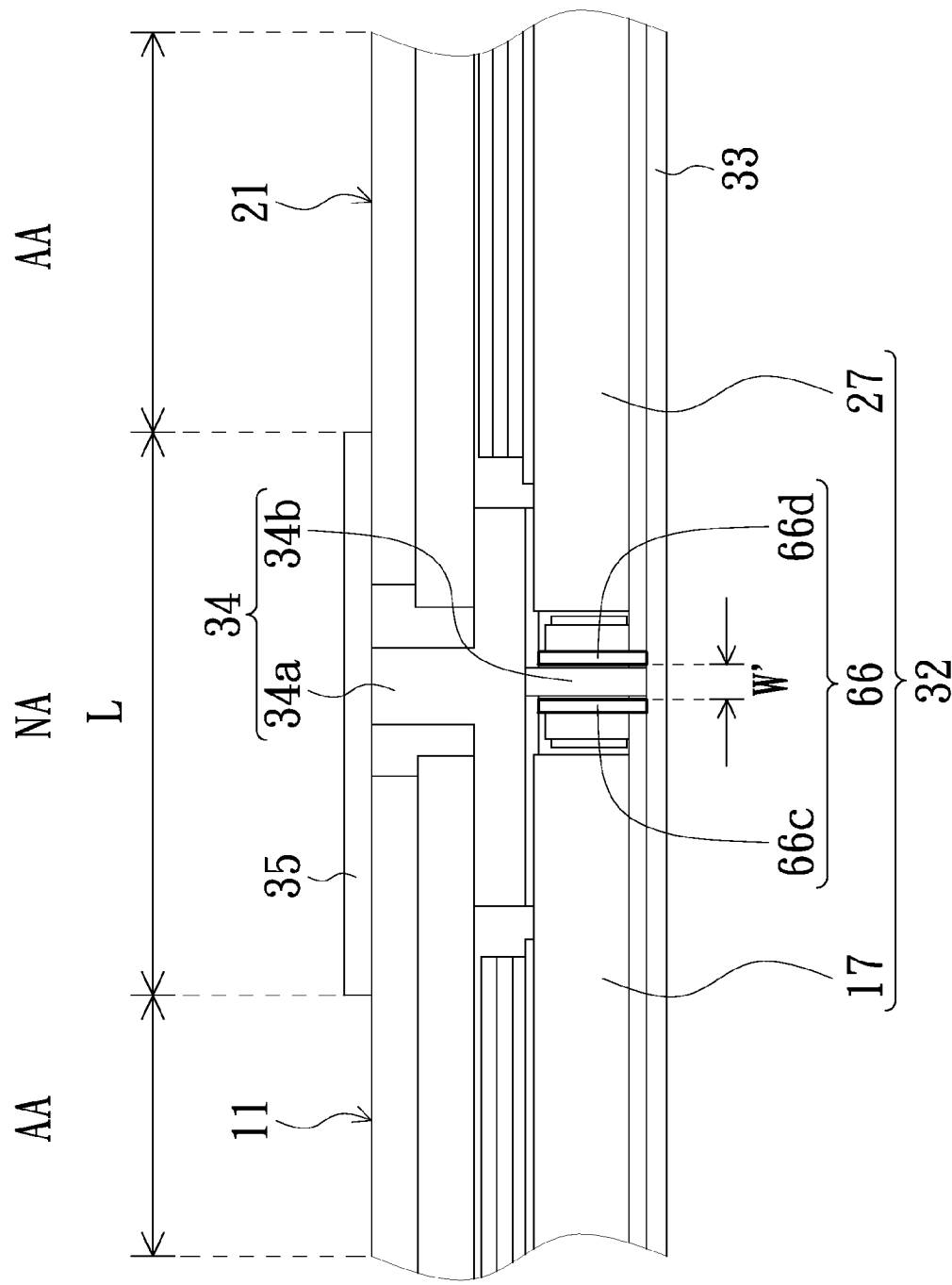
FIG. 12 is a cross-sectional view of a multiple-display device according to a sixth embodiment.

FIG. 12 is a cross-sectional view of a multiple-display device according to a sixth embodiment. The construction of the multiple-display device 90 is similar to that of the multiple-display device 70 illustrated in FIG. 8 except the features to be described hereinafter.

As shown in FIG. 12, the strip light source 66 comprises two strip-shaped boards 66c and 66d disposed in parallel with a gap W' existing therebetween. A supporting part 34b of the frame 34 extends downwardly from the partition wall 34a and passes through the gap W' to reach the bottom bezel 33, with which the structure of the display device 90 can be strengthened and the ability of the frame 34 to support the liquid crystal panels 11 and 21 can be improved.

Figure 13:
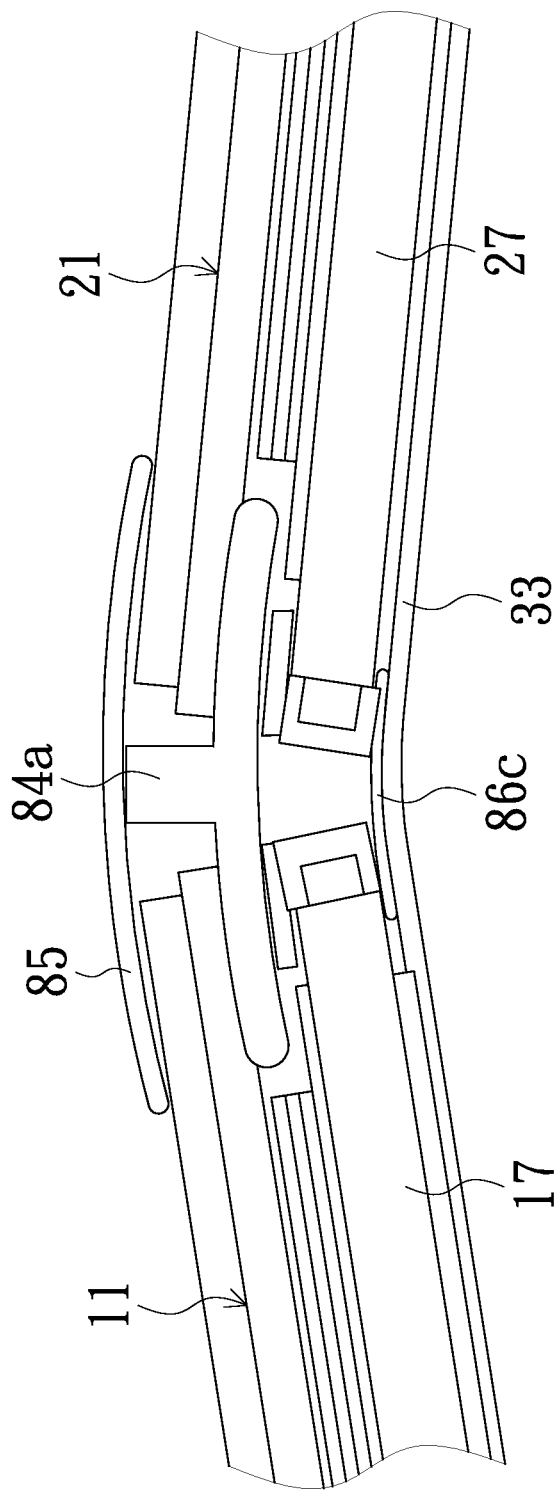
FIG. 13 is a cross-sectional view of a multiple-display device according to a seventh embodiment.

FIG. 13 is a cross-sectional view of a multiple-display device according to a seventh embodiment. In this embodiment, one or more of the top case 85 for fixing the liquid crystal panels 11 and 21, the partition wall 84a, the strip-shaped board 86c and the bottom bezel 33 are formed of flexible material, such as plastic, so as to make adjacent liquid crystal panels 11 and 21 slightly bendable to meet the demand on curved displays.

Although not all these parts are necessary to be flexible, but it is preferably that all the above-mentioned parts are made of flexible material in order to achieve maximum bending capability.

To summarize, by using the backlight unit design according to the present invention to emit light to opposite sides, the material cost for frameworks, bezels and cases between adjacent liquid crystal panels in related art can be reduced. Then, by combining the light-guiding plates on opposite sides of the strip light source, the demand on a narrow border of the multiple-display device could be achieved. Besides, by using a partition wall with a supporting part extending downwardly from the partition wall and passing through the gap between the first and the second groups of light-emitting elements to reach the strip-shaped board or bottom bezel can improve the ability of the frame to support the display panels and strengthen the structure.

Furthermore, if the top case, the partition wall, the strip-shaped board and/or the bottom bezel are formed of flexible material, the device can be bent to a certain extent to achieve the demand on curved displays.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device, comprising:
   at least two display panels;
   a frame for supporting the display panels, comprising a partition wall configured for supporting at least an end portion of the display panels; and
   a backlight unit located at one side of the display panels, and providing light to the display panels, wherein the backlight unit comprises:
   a strip light source, a longitudinal edge of which is extended along a longitudinal edge of the partition wall, emitting light to the display panels disposed at opposite sides of the partition wall, wherein the strip light source comprises a first group of light-emitting elements and a second group of light-emitting elements, the first group of light-emitting elements and the second group of light-emitting elements emit light toward the display panels disposed at the opposite sides of the partition wall, respectively, and there is a gap extending along the longitudinal edge of the strip light source and disposed between the first group of light-emitting elements and the second group of light-emitting elements; and
   two light-guiding plates disposed at opposite sides of the strip light source, and guiding the light emitted from the strip light source into the display panels, wherein the frame comprises a supporting part extending downwardly from the partition wall and passing through the gap to reach a bottom of the strip light source.

2. The display device according to claim 1, wherein the strip light source comprises a strip-shaped board, on a top surface of which the first group of light-emitting elements and the second group of light-emitting elements are disposed.

3. The display device according to claim 2, wherein the first group of light-emitting elements and the second group of light-emitting elements are alternately disposed on the strip-shaped board.

4. The display device according to claim 3, wherein a light emitting surface of each of the light-emitting elements in both the first group and the second group is perpendicular to a top surface of the strip-shaped board.

5. The display device according to claim 3, wherein the first group of the light-emitting elements overlaps with the second group of light-emitting elements along a longitudinal edge of the strip-shaped board.

6. The display device according to claim 3, wherein the first group of light-emitting elements and the second group of light-emitting elements are staggered along a longitudinal edge of the strip-shaped board while the first group of light-emitting elements partially overlaps with the second group of light-emitting elements along a transverse edge of the strip-shaped board.

7. The display device according to claim 2, wherein the gap extends along a longitudinal edge of the strip-shaped board.

8. The display device according to claim 1, wherein the strip light source comprises two strip-shaped boards disposed in parallel, on respective lateral surfaces of which the first group of light-emitting elements and the second group of light-emitting elements are disposed with light emitting surfaces of the first group of light-emitting elements and the second group of light-emitting elements respectively parallel to the lateral surfaces of the strip-shaped boards.

9. The display device according to claim 8, wherein the gap is formed between the strip-shaped boards.

10. The display device according to claim 9, further comprising a bottom bezel for supporting the frame and the backlight unit.

11. The display device according to claim 10, wherein the supporting part passes through the gap to reach the strip-shaped board or the bottom bezel.

12. The display device according to claim 10, wherein the partition wall, the strip-shaped board or the bottom bezel are formed of flexible material.

13. The display device according to claim 10, wherein the partition wall, the strip-shaped board and the bottom bezel are formed of flexible material.

14. The display device according to claim 7, further comprising a bottom bezel for supporting the frame and the backlight unit.

15. The display device according to claim 14, wherein the supporting part passes through the gap to reach the strip-shaped board or the bottom bezel.

16. The display device according to claim 14, wherein the partition wall, the strip-shaped board or the bottom bezel are formed of flexible material.

17. The display device according to claim 14, wherein the partition wall, the strip-shaped board and the bottom bezel are formed of flexible material.

18. The display device according to claim 2, wherein the partition wall and the strip-shaped board are formed of flexible material.

* * * * *